March 11, 1930.  H. WEICHSEL  1,750,076
ALTERNATING CURRENT MOTOR
Filed Jan. 26, 1929
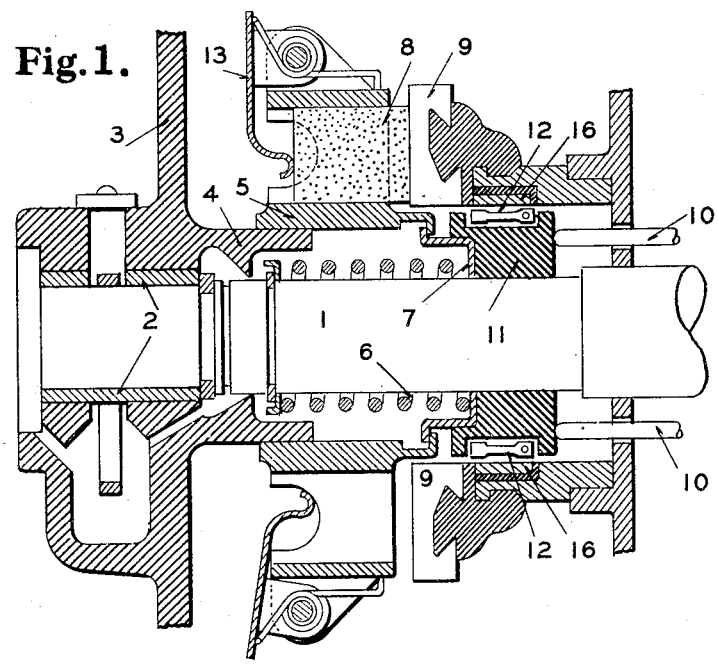
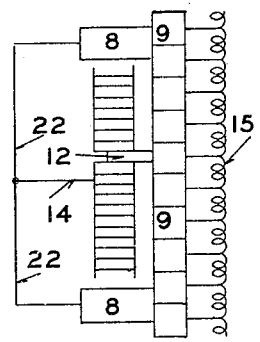
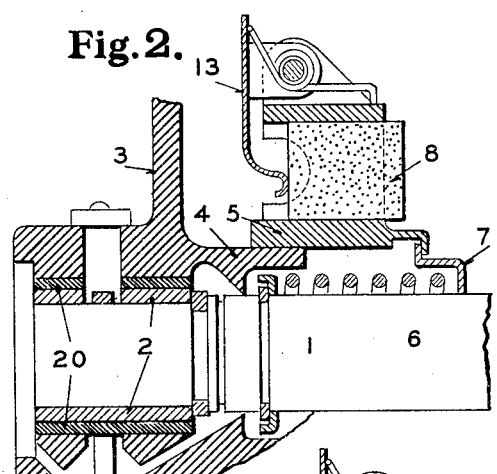
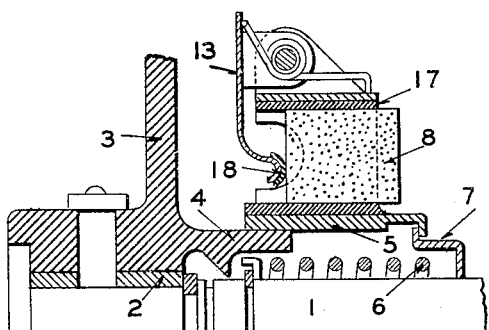
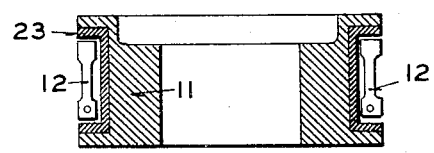
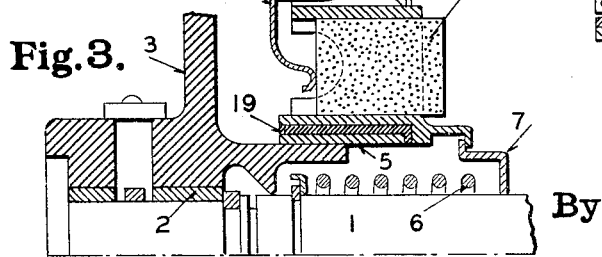
Inventor
HANS WEICHSEL
By E. E. Kluppman
Att'y.

Patented Mar. 11, 1930

1,750,076

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING-CURRENT MOTOR

Application filed January 26, 1929. Serial No. 335,301.

My invention relates to the discovery of conditions which establish currents through the bearings of repulsion-induction motors of usual construction as to circuit changing mechanism, and means for preventing such currents. In machines of this type brushes cooperate with the commutator during the starting period and are moved out of contact by centrifugal mechanism when a predetermined speed has been reached, and the segments of the commutator are short-circuited by suitable mechanism also actuated by the centrifugal device. I have found that in all existing machines of the type referred to with which I am familiar that the shaft bearings become pitted in the use of the machine and I have discovered that this is due to currents which at times circulate during starting operation of the machine in a path which includes the motor shaft, its bearing, and the frame of the machine, and that the establishment of these currents results from mechanism and electrical factors which are inherent in the operation of the elements of a machine of this type. It is desirable that the brushes remain in contact with the commutator until all of the commutator segments have been short-circuited, and it is further essential to the satisfactory short-circuiting of all of the segments by means of centrifugally operated mechanism, that the short-circuiting device comprise a plurality of separately movable elements. One type of short-circuiting device commonly used is illustrated in the accompanying drawings and comprises a plurality of small short-circuiting elements which are brought into contact with the commutator by centrifugal force when they are moved into operative relation with the commutator by the centrifugal mechanism. Another form of short-circuiting device which has been used in machines having a commutator provided with a vertical face, is a metal disk having radially extending slots around its outer part, forming a plurality of resilient contacting fingers to engage with the commutator segments. Such a device is illustrated in the Wolff Patent No. 1,695,789.

When all of the commutator segments are short-circuited no current is produced which tends to circulate through the shaft bearing faces of the motor bearings, but in any commutator short-circuiting mechanism made up of a plurality of independently movable elements (and such mechanism must be so made to satisfactorily short-circuit the commutator) some of the short-circuiting elements may not be in proper contact with the commutator prior to the time that the brushes are moved out of contact with the commutator. This condition permits the establishment, in motors of this type as heretofore made, of a current set up by the voltage in an unshort-circuited armature coil and through the armature shaft and its bearing because some part at least of the short-circuiting mechanism is carried on the shaft, and the brush holder mechanism is carried on an end plate or other part of the frame of the machine.

The condition just described may be overcome by the insertion of insulating means at some point between the elements of the circuit that has, due to the condition described, frequently existed, particularly during the starting period of the machine, and by thus preventing the circulation of current through the contact faces of the shaft and bearing the durability of the bearing is very greatly increased. For example, I found by test on a machine of the type shown in Figure 1 of the drawings but without insulating means, that after 30,000 starts and stops the bearings were brought to a condition where they required replacement, whereas a machine of the same kind but provided with the insulating means shown in Figure 1, has been started and stopped over 200,000 times without noticeable wear on the bearings.

The accompanying drawings illustrate several specific means for preventing the establishment of the shaft currents hereinabove referred to. Figure 1 is a view, partly in cross section and partly in elevation, of a sufficient portion of the mechanical elements and the circuit reorganizing means of one known type of repulsion-induction motor to illustrate one possible means of preventing the establishment of shaft currents; Figures 2 to 4, inclusive, are similar views illustrating other means; Figure 5 illustrates a modification of the insulating element of Figure 1; and Figure 6 diagrammatically indicates circuit elements and a condition which may establish current through the shaft bearings in the absence of means or equivalents thereof herein described for preventing such currents.

The mechanism shown in Figure 1, except for the insulating means therein embodied for the purpose herein described, is of a well known type. The shaft 1 is journaled in bearing 2 carried by the end plate 3, which end plate has an inwardly extending hub 4 on which the hub 5 of the brush holder is slidably mounted, and this holder is, by means of the spring 6 on the shaft 1 and the cup 7 which engages with the holder, held in such position at the time of starting the motor that the brushes 8 contact with the commutator 9. When the motor has reached a predetermined speed, centrifugal mechanism carried by the shaft (which mechanism is not shown as it may be of any known type), actuates the rods 10 to move the collar 11 to the left and bring the short-circuiting elements 12, carried in a peripheral groove on this collar, into alignment with the segments of the commutator 9 and with a conducting ring 16 insulated from its support as shown, and the elements 12 move outwardly under the influence of centrifugal force into contact with said segments and ring to short-circuit the commutator. During the motion of the collar 11 under the influence of the centrifugal mechanism, it comes in contact with the hub of the brush holder, as indicated in the drawing, and moves the holder to a sufficient degree to carry the brushes out of contact with the commutator. The extent of this motion before the brushes leave the commutator will vary with the length of the brush since the brush will remain on the commutator until the brush follower 13 reaches the limit of its brush advancing travel.

In prior machines the collar 11 has been made of electrically conductive material and mounted in conductive relation with the shaft. With this construction a current would be set up through the shaft bearings under a condition that before all of the brushes leave the commutator less than all of the commutator segments are short-circuited, the path of this current including a brush, its holder, the mounting hub on the end plate, the shaft bearings, the shaft, the collar 11, and the segments 12 of the short-circuiting mechanism which may be in contact with a segment of the commutator and also directly, or through other segments, in electrical contact with the collar 11. Such a circuit and the voltage source of current for it is diagrammatically illustrated in Figure 6 where the line numbered 14 indicates the armature shaft; the block 12, one of the elements of the commutator short-circuiting device; the squares 9, segments of the commutator interconnected by the armature winding 15; 8 the brushes; and lines 22, the current path from brushes through the end plate and bearing to the shaft. When one of the elements 12 of the short-circuiting device is in contact with a commutator segment, and either directly, or indirectly through other elements 12, with the collar 11, and not all segments of the commutator are so short-circuited as to short-circuit all of the armature coils, the voltage induced from the stator winding in the un-short-circuited coil will establish a current through the circuit just described.

In the apparatus illustrated in Figure 1, I have prevented the establishment of the undesired circuit described by making the collar 11 of insulating material, (and the same result can be achieved by electrically separating the short-circuiting segments from it by means of insulation 23, as shown in Figure 5), and by insulating the short-circuiting ring 16 from the commutator hub, whereby none of the short-circuiting elements can establish a shaft circuit, either by way of the collar 11, or the short-circuiting ring 16.

The undesired shaft and bearing circuit can be also interrupted by insulating the brushes from the holder, as indicated, by insulating material numbered 17 in Figure 4 between the brush and the walls of the holder and insulating material 18 between the brush follower and the brush; or by insulating the brush holder from its supporting hub by means of insulating sleeve 19 shown in Figure 3; or by insulating the bearings from the end plates by means of insulating sleeves 20, as shown in Figure 2. I prefer the means illustrated in Figure 5 as probably the most convenient and inexpensive from the standpoint of both manufacture and use.

Having fully described my invention, what I claim as new and desire to secure by Letters Patent of the United States is:

1. In a dynamo electric machine provided with a commutator and brushes, means for short-circuiting the commutator which comprises a collar mounted on the shaft of the machine and provided with a circumferential recess and commutator short-circuiting elements carried in said recess, centrifugal means for moving the brushes out of contact with the commutator and for moving the short-circuiting elements into operative position with respect to the commutator, and means insulating the short-circuiting elements from the collar.

2. In a dynamo electric machine provided with a commutator and brushes, means for short-circuiting the commutator which comprise a conducting element positioned adjacent to the commutator and a collar mounted on the shaft of the machine and provided with a circumferential recess and short-circuiting elements carried in said recess, centrifugal means for moving the brushes out of contact with the commutator and for moving the short-circuiting elements into operative position with respect to the commutator and the conducting element, means insulating the short-circuiting elements from the collar, and means insulating the conducting element from the shaft of the machine.

In testimony whereof, I hereunto affix my signature, this 22 day of January, 1929.

HANS WEICHSEL.